US006950961B2

(12) United States Patent
Krause et al.

(10) Patent No.: US 6,950,961 B2
(45) Date of Patent: Sep. 27, 2005

(54) HIGHLY AVAILABLE, MONOTONIC INCREASING SEQUENCE NUMBER GENERATION

(75) Inventors: Michael R. Krause, Boulder Creek, CA (US); Kimberly K. Scott, San Jose, CA (US); Fred B. Worley, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

(21) Appl. No.: 09/783,159

(22) Filed: Feb. 13, 2001

(65) Prior Publication Data

US 2002/0112139 A1 Aug. 15, 2002

(51) Int. Cl.[7] ................................................ G06F 11/00
(52) U.S. Cl. ................... 714/4; 714/6; 714/43
(58) Field of Search .................... 714/4, 6, 3

(56) References Cited

U.S. PATENT DOCUMENTS

| | | | | |
|---|---|---|---|---|
| 6,119,244 A | * | 9/2000 | Schoenthal et al. ........... 714/4 |
| 6,161,198 A | * | 12/2000 | Hill et al. ..................... 714/15 |
| 6,219,800 B1 | * | 4/2001 | Johnson et al. ................ 714/5 |
| 6,247,141 B1 | * | 6/2001 | Holmberg ....................... 714/2 |
| 6,249,877 B1 | * | 6/2001 | Kawakami et al. ............ 714/6 |
| 6,539,446 B1 | * | 3/2003 | Chan ......................... 710/200 |
| 6,594,786 B1 | * | 7/2003 | Connelly et al. ............. 714/50 |
| 6,629,261 B1 | * | 9/2003 | Chintada et al. ............... 714/4 |
| 6,658,585 B1 | * | 12/2003 | Levi .............................. 714/4 |

* cited by examiner

*Primary Examiner*—Nadeem Iqbal
*Assistant Examiner*—Timothy M. Bonura

(57) ABSTRACT

The present invention relates to highly available sequence number generation with minimal latency. The present invention involves establishing a primary and secondary sequence number generators. A sequence number request is forwarded to the primary generator. The primary generator determines the next sequence number and forwards the response to the secondary generator. The secondary generator stores the value and forwards the value to the originating entity. Accordingly, the configuration avoids single point failure and is robust against malfunction.

23 Claims, 3 Drawing Sheets

HIGHLY AVAILABLE, MONOTONIC INCREASING SEQUENCE NUMBER GENERATION

TECHNICAL FIELD

The present invention relates to monotonic sequence number generation for use by distributed data processing and in particular to monotonic sequence number generation for use by distributed database-related applications in a highly available and low latency manner.

BACKGROUND

In present business environments, many information systems exist to process transaction information. For example, certain banking information systems may utilize transaction information to track transactions initiated by account holders. A banking information system may store transaction information in a database. Furthermore, the banking information system may utilize transaction numbers to provide order to database actions. The banking information system may assign an ever-increasing (monotonic) sequence of numbers to database actions, so that their order may be retained and processing of the actions may occur in an ordered manner. For example, the banking information system may utilize transaction numbers to ensure that an electronic transfer of funds does not occur before a deposit transaction is completed.

The concept of utilizing transaction numbers is clearly applicable to a very large range of data processing applications in addition to banking information systems. For example, many business to business information systems may require sequence numbering to manage purchase orders, delivery arrangements, invoicing, and payment information via extensive databases. Broadly speaking, the provision of sequence numbers may be thought of as a form of time stamping. Of course, there are numerous applications of time stamping in many industries. Accordingly, it shall be further appreciated that the sequence numbering process is applicable to many applications beyond applications related to financial or commercial environments. In general, any application that orders a significant amount of data objects may utilize sequence number generation. Distributed applications especially benefit from sequence number generation.

Sequence numbering is a relatively simply process to implement upon a single processor system. However, it is evident that most practical applications of sequence numbers require scalability, i.e. the sequence numbering may be employed up to an arbitrary number of logical nodes which are usually distributed across a communication medium or system fabric. To achieve scalability, various mechanisms may be employed, such as determining which process maintains the current sequence number; which process is incrementing the number; which process is retaining a master list of sequence numbers; and the like. To implement these tasks in a distributed manner in a multi-node environment, the respective processors located at the various nodes allocate a portion of processing time to threads responsible for these overhead mechanisms. Additionally, an amount of signaling occurs over the communication medium for similar allocation to overhead mechanisms. When these mechanisms are implemented in software, the overhead processing and communication protocol signaling are significant. By allocating a significant portion of system resources to the overhead tasks, milliseconds of delay are introduced which significantly reduces the scalability of the system. In fact, delays of several milliseconds may cause negative scaling, i.e. coordinating the functionality over several nodes may actually cause a reduction in processing capacity.

Similarly, hardware implementations of the monotonic sequence number generation proved problematic. Hardware implementations have involved placing a device in a system fabric accessible by the various processors by interfaces. In this environment, latency is reduced. However, the price of reducing latency in this implementation is reduced availability. Specifically, this implementation creates a single point of failure that may cause the entire system to malfunction.

SUMMARY OF THE INVENTION

The present invention is directed to a system and method which provides a monotonic sequence number generation that is highly available and possesses minimal latency. The architecture of the present invention involves establishing at least a primary generator and a secondary generator. Applications that utilize transaction numbering to order data may initiate a call in software to obtain a sequence number. The software call utilizes an interface to bypass ordinary network or communication channel protocols. The interface, defined by a hardware or firmware implementation device, preferably generates a sequence number request to the primary unit. After receiving the sequence number request, the primary sequence number generator determines a next sequence number in a monotonic manner. The primary sequence number updates its memory to reflect that the determined sequence number has been utilized. The primary sequence number generator forwards the determined sequence number to the secondary sequence number generator. The secondary sequence number generator updates its memory to reflect that the determined sequence number has been utilized. The secondary sequence number generator forwards the determined sequence number to the initial hardware implementation device. Finally, the hardware implementation device returns the sequence number to the appropriate application process.

It is a further aspect of the present invention to provide sequence number generation in a manner that is robust against failure. Since the secondary generator forwards the determined sequence number to the hardware implementation device, the secondary generator maintains a record of the last sequence number utilized by an application. Occasionally, the primary unit may become unavailable due to hardware difficulties or communication link failure. If this occurs, the underlying architecture may readjust by reassigning the secondary generator as the primary generator. Similarly, the underlying architecture may assign a new secondary generator. By doing so, the current sequence number is not lost upon failure of the primary sequence number generator. Future sequence requests may be forwarded to the new primary generator, thereby increasing availability. Secondly, the architecture may perform the adaptation in a manner that is transparent to application processes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
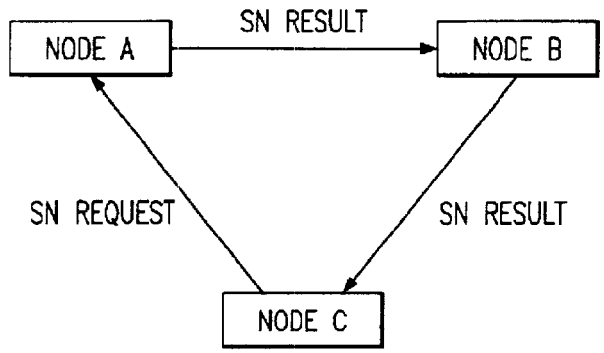
FIG. 1 comprises a simplified system architecture and signal flow to illustrate the present invention.

Turning now to the drawing, FIG. 1 illustrates a simplified signaling progression associated with sequence number generation. An application process at node C may generate a sequence number (SN) request. Firmware at node C generates a SN message with the ID of node A thereby causing the request to be routed to node A. Node A responds to the request by creating an SN response comprising the ID of node B, thereby causing the SN response to be routed to node B. After receipt, node B forwards the request comprising the ID of node C, thereby routing the SN response to its ultimate destination, node C. The firmware initiates a direct memory access (DMA) to place the received response in a memory location accessible by the originating application process.

It is an advantage of the present invention to facilitate the embodiment of sequence number generation in a wide variety of hardware and/or firmware implementations. By way of example and without limitation, the sequence numbering in the node system of FIG. 1 may be implemented by adapter cards located at nodes A, B, and C. The implementation of the present invention is not limited to adapter cards. For example, the present invention may be implemented in host/appliance software, firmware, ASICs, fabric elements (e.g. augmenting a switch implementation) or any combination thereof. It shall be appreciated that any further discussion of adapter cards or firmware refers broadly to all of the preceding implementations.

In FIG. 1, the adapter cards may be employed to provide replicated fabrics. In this exemplary embodiment, each node may comprise two cards. In normal operation, node C forwards a request to node A. Node A may increment the present value, DMA the incremented value to a memory location in its host processor system, and forward the value to node B. Node B may DMA the value to a memory location in its host processor system and forward the result to C. If the operating card on node A becomes unaccessible for some reason (card malfunction, switch failure, cable failure, and/or the like), failure over to the other card may occur instead of changing the primary and secondary designations. Since the incremented value is stored in the memory of the host systems, it is sufficient to reinitialize to the other cards. Accordingly, this embodiment provides an alternative recovery mechanism. However, it shall be appreciated that this configuration permits recovery either through DMA operations or failure to the other node. It is not necessary to restrict recovery to only one of these mechanisms.

The SN representation may comprise an arbitrarily large number of bits. In a preferred embodiment, the SN representation comprises 48-bits. Obviously, the sequence numbering space associated with a bit-limited representation is finite. Accordingly, the sequence number generation is not monotonic in a strict mathematical sense. However, it is estimated that normal database operation in connection with 64-bit sequence numbering would require years to exhaust the attendant sequence numbering space. Accordingly, the 48-bit or 64-bit embodiments are sufficient to establish the desired ordering functionality.

The present invention preferably utilizes pipelining to deliver sequence number requests. Pipelining involves a distinction between strong ordering and weak ordering. In strong ordering, sequence numbers are assigned monotonically in response to the arrival of sequence number requests. Additionally, strong ordering involves delivering the sequence numbers in the same order as the sequence number request arrivals. In weak ordering, sequence numbers are also assigned monotonically in response to the arrival of sequence number requests. However, weak ordering does not require that the sequence number response values be delivered in order according to the request arrivals. Pipelining may be utilized if node C comprises numerous processors. By utilizing weak ordering, pipelining allows numerous sequence number requests to be processed concurrently without having node C wait until individual requests are completed before initializing another request.

Additionally or alternatively, a transaction identifier may be included in each sequence request packet. By utilizing such transaction identifiers, it may be possible to have potentially thousands of outstanding requests at any one time. It is a further advantage of the present inventive system and method to achieve greater scalability by utilizing pipelining. Nonetheless, it shall be appreciated that the present invention may utilize strong ordering techniques.

Figure 2:
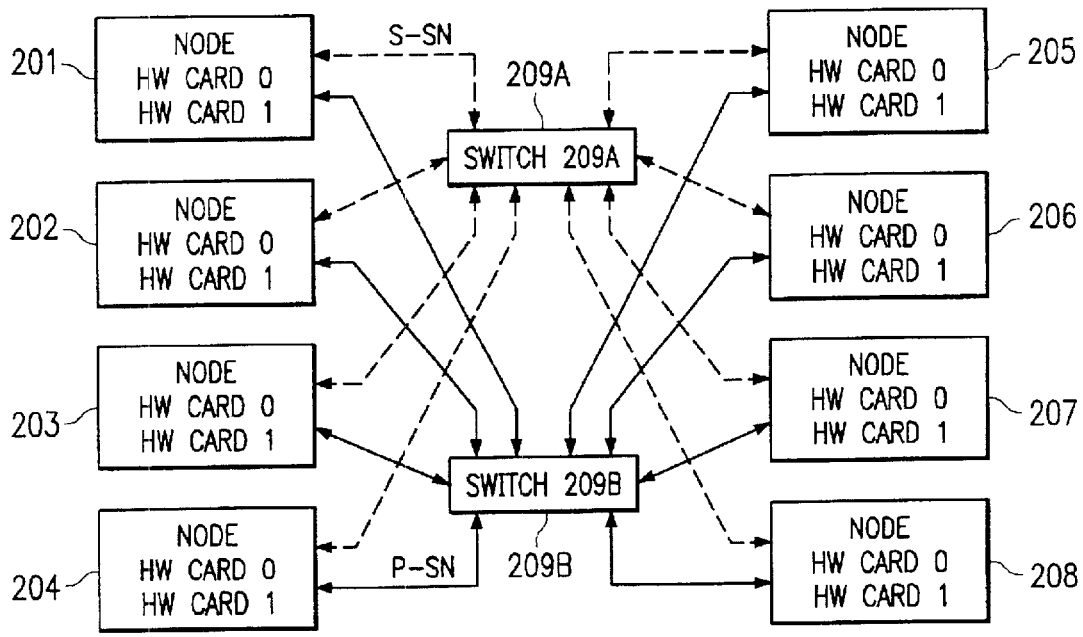
FIG. 2 comprises a redundant system architecture to illustrate the present invention.

FIG. 2 illustrates an exemplary architecture employing the present invention. The network of FIG. 2 comprises a plurality of nodes (201–208) and a plurality of switches (209A and 209B). It shall be appreciated that the architecture is merely exemplary and that an arbitrary number of nodes and switches may be utilized. Each node comprises a plurality of HW cards (HW cards 0 and HW cards 1) to facilitate connection to nodes 209A and 209B, respectively. The HW cards preferably provide an interface to the monotonic sequence generation fabric. The cards preferably provide lower level routines to request sequence numbers, issue or store sequence numbers for generator units, and/or initiate recovery measures. HW cards 0 of nodes 201–208 define logical connections from each node to switch 209A. HW cards 1 of nodes 201–208 define logical connections from each node to switch 209B. Accordingly, this embodiment employs a duplicated fabric configuration.

Additionally, it shall be appreciated that a requesting node may be one of the primary or secondary generators. Utilizing the preceding discussed configuration, if an application upon node 204 requests a sequence number, HW card 0 of node 201 may increment the current value, DMA the value, and forward the value to HW card 0 of node 203. Node 203 may increment the value and forward the value back to HW card 0 of node 204. In this manner, it is ensured that the current value is retained on both the primary and secondary generators. After receipt of the return value, HW card 0 may DMA the value for receipt by the appropriate application process.

By way of example, the system may be initially configured to have node 204 as the primary generator and node 203 as the secondary generator. If node 201 issues a sequence number request and the system is utilizing the first fabric, node 201 may transmit the request via its HW card 0 through switch 209A. After receipt of the request, HW card 0 of node 203 may perform the increment operation, DMA operation, and forward operation through switch 209A. After receipt of the forwarded value, HW card 0 of node 204 may perform the DMA operation and the forward operation through switch 209A to HW card 0 of node 201. After receipt of the value, HW card 0 of node 201 may DMA the value for receipt by the appropriate application process. Upon failure (for example the failure of HW card 0 of node 208), the system may be reconfigured by system management logic to utilize the secondary fabric defined by HW cards 1 and switch 209A.

Alternatively, if both cards of the primary generator (node 204) fail, the manager process may detect the failure. The manager process may cause the secondary generator (node 203) to become the new primary generator, since node 203 has the current sequence number value. The manager process may preferably be implemented as middleware software that is independent of the applications utilizing the sequence number generation. Secondly, the manager process may select a new secondary generator. The new secondary generator receives the current value from node 203. Of course, the manager process communicates the identity of the new primary and secondary generators to the various nodes. At this point, all of the nodes except for node 204 are able to communicate with the new primary and secondary generators. Accordingly, process applications on these nodes are able to continue functions, since the sequence number generation remains available. Accordingly, the failure of both cards of node 204 only causes node 204 to cease to function. Thus, the present invention avoids a single point of failure, since failure of one node does not impede the remaining nodes of the network.

It shall be appreciated that, in the event of unavailability of the secondary generator, identical processing may be utilized to select an alternative secondary generator and to provide the current sequence number to the newly designated secondary generator. It shall be further appreciated that the preceding architecture is merely one embodiment of the present invention. The present invention does not require any rigidly defined hardware implementation. The present invention is preferably implemented transparently within an existing network or fabric. For example, it is contemplated that the network of FIG. 1 could constitute a pre-existing configuration. The present invention may be employed upon the pre-existing configuration with minimal modification by adding the sequence number generation mechanisms with connections to pre-existing switches 209A and 209B. Accordingly, it is an advantage of the present invention to provide a highly available sequence number generation to a system of nodes with minimal modifications.

As previously noted, the present invention preferably employs SN interfaces to provide sequence number generation to application processes in a transparent manner.

Preferably, a library of user-space functions/routines is provided to access lower level sequence number routines of a selected device hardware/firmware implementation. The library may comprise the following exemplary functions/routines:

snbgn( )—a function that is responsible for seeding the SN generator. Specifically, the seed operation selects a current sequence number that is sufficiently greater than a last known value so that it is highly probably that the current sequence number is beyond any value currently in flight. The routine may open a domain socket to a management thread and send a message containing the new SN value. The thread may contact the primary and secondary generators to determine if they are operational and may "seed" the firmware.

snnew( )—a function that is utilized by process applications to transparently generate a new SN value. The function call operates from the perspective of an application as an ordinary function call. The function may preferably be implemented as a light-weight call, as will be discussed in greater detail below. In the event of a time-out, the function may invoke a heavy-weight system call which may invoke sleeping.

sncur( )—a function that returns the current global SN value.

snadj( )—a function that allows the current global SN value to be incremented by an offset to insure that no sequence number replication occur after a recovery is completed.

It shall be appreciated that the use of a light weight system call such as snnew( ) is only one possible implementation. For example, similar functionality may be achieved utilizing a work request to the underlying hardware without requiring an application to perform a system call. Such an implementation would define a hardware work request which provides the same set of services and essentially the same output would occur. Alternatively, a system call may be implemented via a user application library call utilizing operating system bypass technology. Accordingly, it shall be appreciated that terms system call, light weight system call, and user application library call shall be interpreted equivalently.

Figure 3:
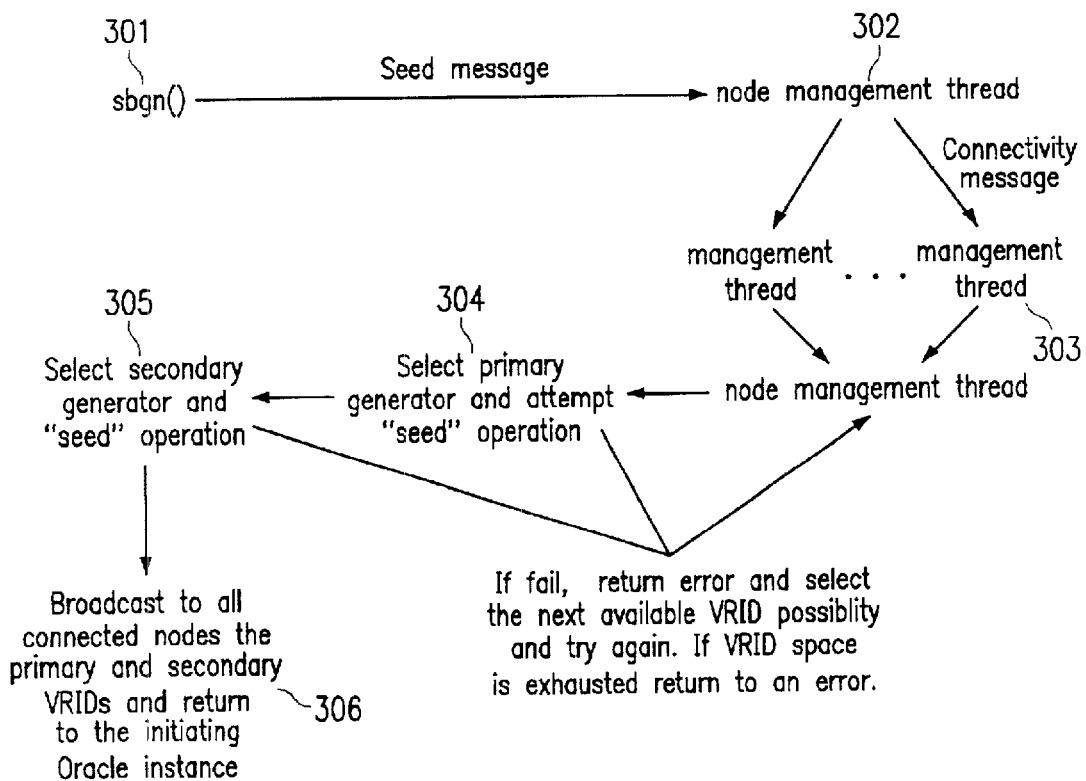
FIG. 3 illustrates processing steps associated with initialization of a highly available sequence number generation architecture.

As previously noted, the sequence number generation may be employed in a wide variety of hardware configurations. Additionally, the configuration within a specific network or system may vary due to installation or removal of new resources, links, and/or the like. Accordingly, the present invention may employ a configuration process to establish primary and secondary generators. FIG. 3 illustrates exemplary steps in such a configuration process. The configuration process may be initiated by a call to snbgn( ). The function snbgn( ) is preferably implemented so that it communicates a seed message to a node management thread, instead of the local hardware/driver. In step 302, the node management thread may then initiate a primary and secondary generator election process. In step 303, the node management communicates a connectivity message to determine the status of all nodes within a cluster. The node management thread may then select a primary generator. After selecting the primary generator, the node management thread attempts a seed operation in step 304. Similarly, the node management thread may select a secondary generator and attempt a second seed operation in step 305. Of course, if any of the seed operations fail, the node management thread may select another generator and repeat the respective seeding step as many times as necessary to complete the selection process. After the primary and secondary generators have been selected and seeded, the ID of each generator may be broadcast to all connected nodes.

Figure 4:
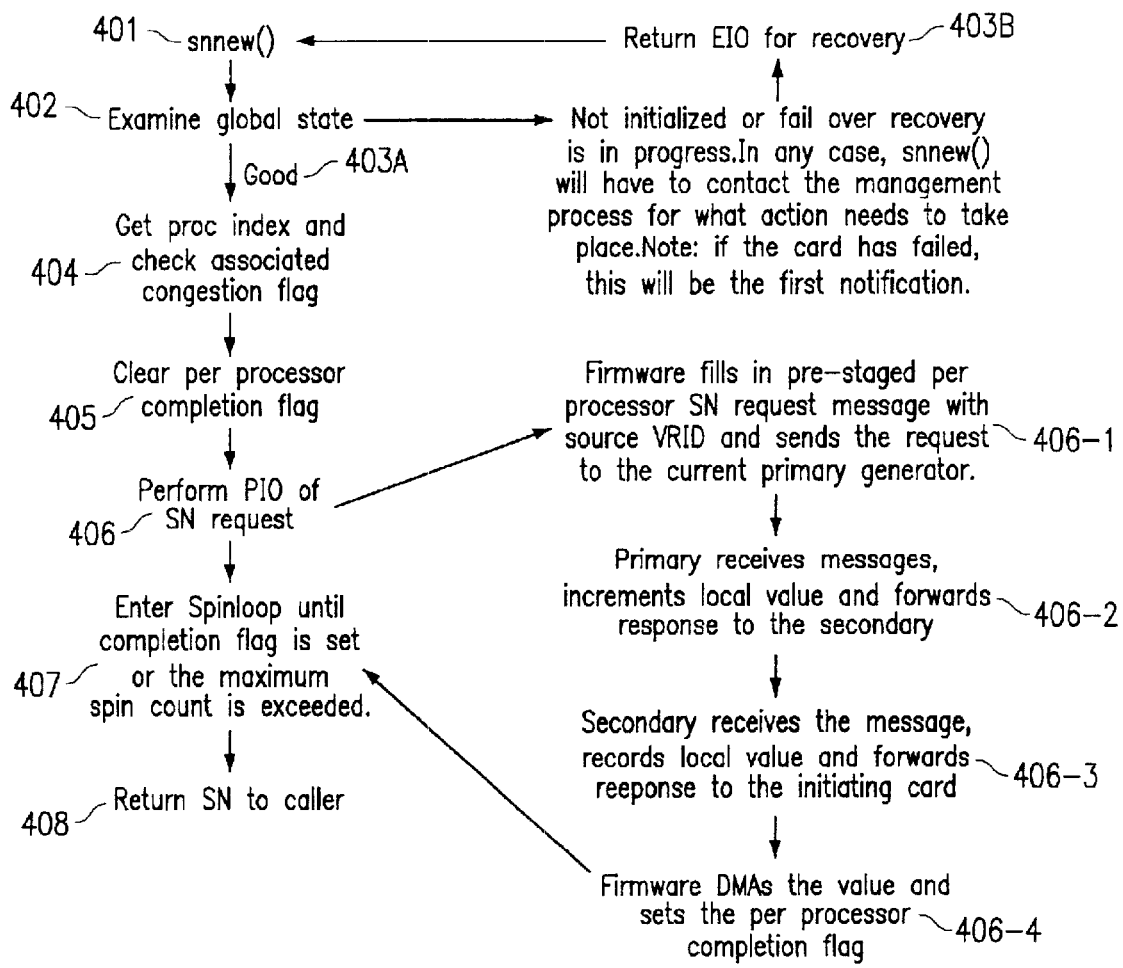
FIG. 4 illustrates a light-weight call by an application process to obtain a sequence number and associated underlying processing steps.

FIG. 4 illustrates an exemplary SN operation within a light-weight system call. In step 401, the processing steps may begin by an application process performing a snnew( )

call. In step 402, the global state is examined. If the state in the firmware device is enabled and the fabric is viable, the process continues in step 403a. It shall be appreciated that the implementation utilizing firmware is only one embodiment of the present invention. The steps associated with firmware in this example could also be implemented in a variety of hardware structures. In step 403b, the global state is determined to be deficient and a return error message is generated for recovery purposes. In step 404, the operating processor is determined. The processor completion flag is cleared (step 405) and a PIO is performed to request a SN value from the fabric (step 406). Firmware sends an SN request comprising the primary ID to the primary generator (step 406-1). The primary generator receives the message, increments local value, and forwards a response to the secondary generator (step 406-2). The secondary generator receives the message, records the SN value, and forwards the response to the initiating firmware (406-3). Firmware performs a DMA to place the value into memory and sets the processor completion flag (step 406-4). Concurrently to the underlying operations of steps 406-1 through 406-4, a spin loop is executed until the completion flag is set or the maximum spin count is exceeded (step 407). Upon detection of the completion flag, the processor breaks out of its spin loop and returns the value to the application process that performed the snnew( ) call. If the processor breaks from the spin loop after completing the maximum spin count, a heavy-weight call may be initiated as will be discussed in greater detail below.

It shall be appreciated that the preceding steps facilitate superior data processing performance. Specifically, the hardware implementation of the SN request process allows a SN response value to be received in microseconds. By minimizing the latency of the system, it is not necessary to perform a sleep operation or perform a context switch out. The present invention avoids wasting processing cycles to store and retrieve data for caches associated with placing the calling application process in a sleep state and subsequently reawakening the process.

As mentioned earlier, the present invention may utilize a heavy-weight call in the rare event that a light-weight call is unsuccessful in obtaining a sequence number in a predetermined amount of time. In a heavy-weight call, the application process that made the initial sequence number call is placed into a sleep state. Accordingly, associated cache data is stored and retrieved as other processes utilize processor cycles during the sleep operation. Also, the heavy-weight call may notify the sequence number management thread that a problem has been encountered and recovery measures should be initiated. The management thread may attempt to determine the cause of the delay, such as a malfunctioning card, line, and/or the like and reconfigure accordingly. If the recovery is successful, the management thread may communicate successful recovery to the heavy-weight call process. The heavy-weight call process may then re-request a sequence number. Upon receipt of the sequence number, the heavy-weight call may cause the application process to awaken from the sleep operation and communicate the received sequence number to the process. If the management process is unable to initiate a recovery, the heavy-weight call may communicate an appropriate error message to the calling application process.

When implemented in software, certain elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 5:
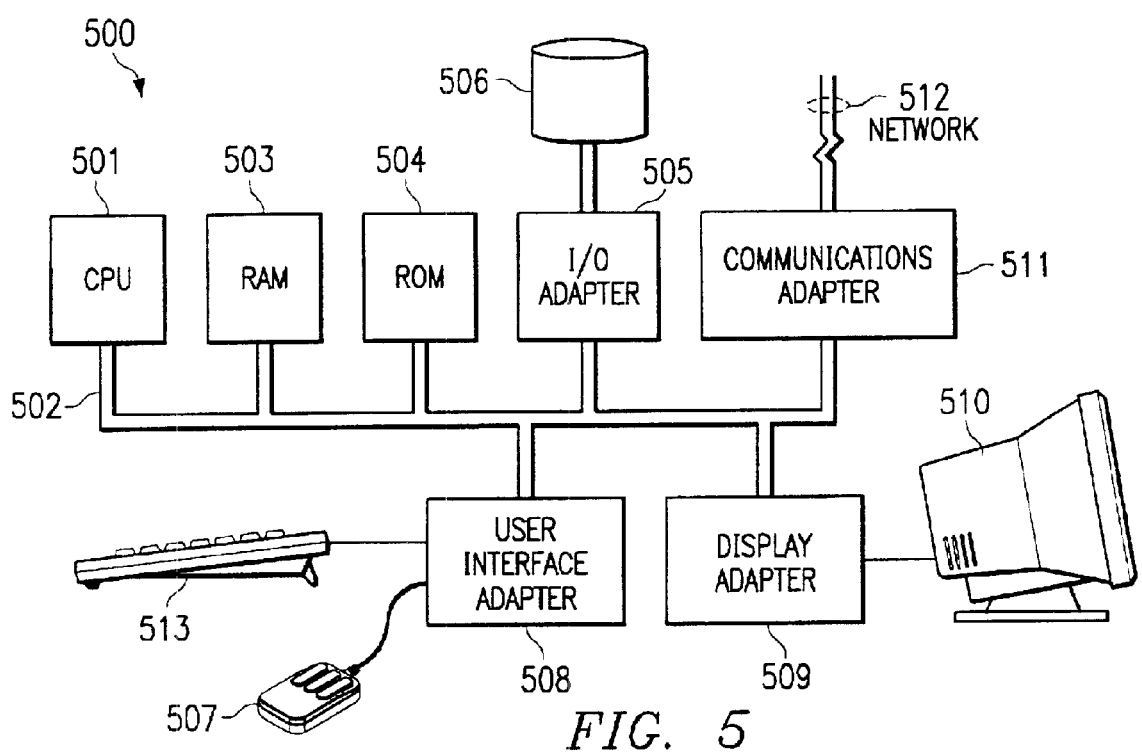
FIG. 5 depicts a block diagram of a computer system which is adapted to use the present invention.

FIG. 5 illustrates computer system 500 adapted to use the present invention. Central processing unit (CPU) 501 is coupled to system bus 502. The CPU 501 may be any general purpose CPU such as an Intel Pentium processor. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O card 505 connects to storage devices 506, such as one or more of hard drive, CD drive, floppy disk drive, tape drive, to the computer system. Communications card 511 is adapted to couple the computer system 500 to a network 512, which may be one or more of telephone network, local (LAN) and/or wide-area (WAN) network, Ethernet network, and/or Internet network. User interface card 508 couples user input devices, such as keyboard 513 and pointing device 507, to the computer system 500. The display card 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of providing monotonic sequence number, comprising the steps of:
   (a) establishing a primary sequence number generator;
   (b) establishing a secondary sequence number generator;
   (c) generating a sequence number request at an originating node;
   (d) forwarding the sequence number request to the primary sequence number generator;
   (e) forwarding a sequence number response to the secondary sequence number generator;

(f) storing the sequence number response at the secondary sequence number generator; and (g) forwarding the response sequence number from the secondary sequence number generator to the originating node.

2. The method of claim 1, wherein step (c) comprises the sub-steps of:

performing a sequence number request call by a software process operating upon a host processor system to a user-space function; and executing a sequence number request via an interface located at the originating node.

3. The method of claim 2 further comprising the step of:

receiving the sequence number response at the interface; and communicating the sequence number response to the software process.

4. The method of claim 3, wherein the software process executes a spin loop while waiting to receive the sequence number response.

5. The method of claim 4, wherein the software process is placed into a sleep state if the sequence number response is not received within a predetermined amount of time.

6. The method of claim 2, wherein the interface is a hardware card linked to a sequence number fabric.

7. The method of claim 6, wherein the host processor system comprises a second hardware card linked to a duplicate sequence number fabric.

8. The method of claim 2, wherein the primary and secondary sequence number generators store current sequence numbers in memory associated with respective host processor systems via direct memory access operations.

9. The method of claim 6, wherein the hardware card pipelines a plurality of sequence number requests.

10. A sequence number generation system for providing monotonic sequence numbers, comprising:

a plurality of sequence number devices, connected via a fabric, including at least a primary sequence number generator and a secondary sequence number generator;

the primary sequence number generator disposed to receive a sequence number request from an originating device and to a forward sequence number response to the secondary sequence number generator; and the secondary sequence number generator disposed to receive the sequence number response, store the sequence number response in memory, and forward the response to the originating device.

11. The system of claim 10, wherein each sequence number device includes lower level sequence number routines accessible by software processes operating on a host processor system via user-space functions.

12. The system of claim 11, wherein the user-space functions includes a request new sequence number function.

13. The system of claim 12, wherein the request new sequence number function causes a requesting application process to execute a spin loop while waiting for receipt of a new sequence number.

14. The system of claim 13, wherein the requesting application process is placed in a sleep state if the new sequence number is not received within a predetermined amount of time.

15. The system of claim 10, wherein the primary and secondary sequence number generators store current sequence numbers in memory associated with respective host processor systems via direct memory access operations.

16. The system of claim 10, wherein the sequence number request is associated with a pipeline of sequence number requests form the originating device.

17. A distributed computing system, comprising:

a plurality of nodes that each comprise at least one processor and at least one sequence number device;

a fabric interconnecting said sequence number devices of said plurality of nodes;

wherein a respective application is executed on a processor of each of said plurality of nodes that uses sequence numbers issued monotonically within said plurality of nodes and said sequence number devices of said plurality of nodes comprises a primary sequence number generator and a secondary sequence number generator;

wherein each of said applications performs a function call to obtain a sequence number, said function call invoking a sequence number routine of a sequence number device that communicates a sequence number request to said primary sequence generator, said primary sequence number generator monotonically generating a sequence number in response to said request and communicating said generated sequence number to said secondary sequence number generator, said secondary sequence number generator storing said generated sequence number and forwarding said generated sequence number to said originating sequence number device, said originating sequence number device returning said generated sequence number in response to said function call.

18. The distributed computing system of claim 17 wherein said originating sequence number device performs a direct memory access to return said generated sequence number.

19. The distributed computing system of claim 17 wherein a processor executing an application that has performed said function call is placed in a spin loop while waiting for said generated sequence number to be returned.

20. The distributed computing system of claim 17 wherein an application performing said function call is placed in a sleep state when said generated sequence number is not received within a predetermined period of time.

21. The distributed computing system of claim 17 wherein a management process, executed on a processor of said plurality of nodes, configures said sequence number devices to select said primary and secondary sequence number generators.

22. The distributed computing system of claim 21 wherein, when said management process detects a failure of said primary sequence number generator, said management process selects said secondary sequence number generator to serve as a new primary sequence number generator.

23. The distributed computing system of claim 21 wherein said management process communicates an identity of said new primary sequence number generator to said sequence number devices of said plurality of nodes.

* * * * *